P. SCHWARZ & W. J. BAKER.
SUBIRRIGATION DEVICE.
APPLICATION FILED JUNE 23, 1916.

1,203,794.

Patented Nov. 7, 1916.

WITNESSES:

INVENTORS
Philip Schwarz
William J. Baker
BY
ATTORNEY

UNITED STATES PATENT OFFICE.

PHILIP SCHWARZ AND WILLIAM J. BAKER, OF OKLAHOMA, OKLAHOMA.

SUBIRRIGATION DEVICE.

1,203,794.  Specification of Letters Patent.  Patented Nov. 7, 1916.

Application filed June 23, 1916. Serial No. 105,370.

*To all whom it may concern:*

Be it known that we, PHILIP SCHWARZ and WILLIAM J. BAKER, citizens of the United States, residing at Oklahoma, in the county of Oklahoma and State of Oklahoma, have invented the Subirrigation Device, of which the following is a full, clear, and exact description, reference being had to the accompanying drawings.

The persons who are engaged in sub-irrigation agriculture, often find great difficulty in preventing the roots of cereals, or grains or other crops or other vegetation from entering into and clogging up the pipe supplying the water.

The main object therefore, of this invention is to provide a device for sub-irrigation that will prevent the roots of said cereals, or grain or other crops or other vegetation from finding their way into or clogging up the pipe supplying the water.

Figure 1:
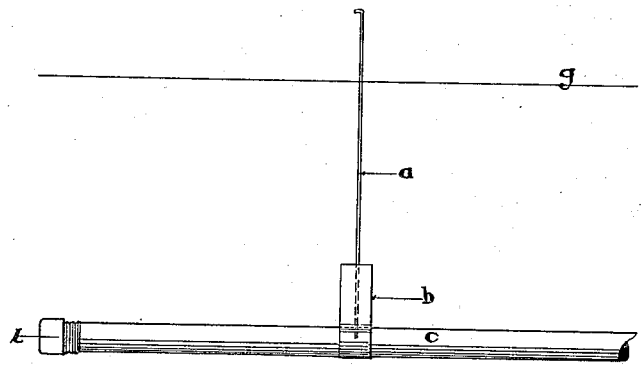
Figure 2:
Figure 3:
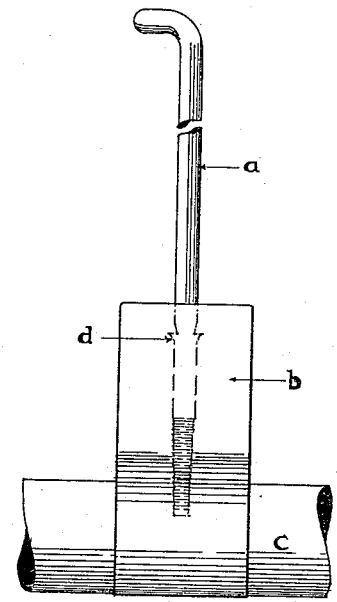
Figure 4:
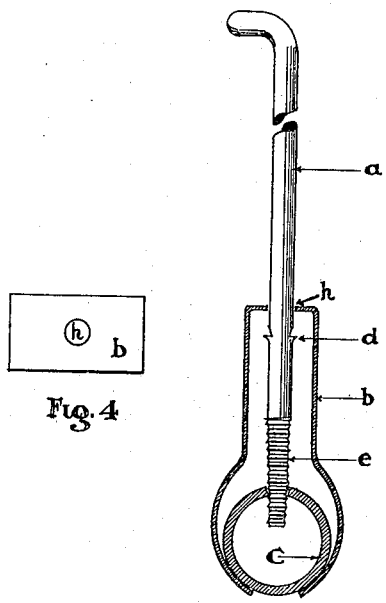
Figure 5:
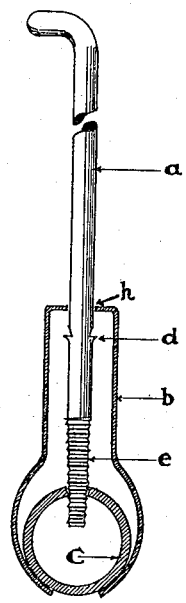

With the above and other objects in view, the inventors have designed and constructed the device shown by the accompanying drawings, in which:

Figure 1, shows the three parts which make up this device. Fig. 2, shows a small scale cross section of said device. Fig. 3, shows a side view of the device. Fig. 4, shows the top view of one part of the device. Fig. 5, shows the cross-section of the device.

Referring to the several figures in all of which like characters represent like parts: The character $a$ represents shut-off rod which extends from above the ground down into the pipe. The pipe end of this rod has a tapered thread as indicated by letter $e$ in Fig. 5.

The character $b$ represents the clamp, which prevents the rod from being turned out of the pipe.

The character $c$ represents the iron pipe through which the water flows and is furnished.

The character $d$ represents the shoulder which is cut into the rod preventing same from being turned out of clamp.

The character $g$ represents the top of soil or ground line.

The character $h$ represents the hole through which the rod enters the clamp.

The tapered thread being smaller at the lower end than at the upper end of the same, permits the water to flow from the iron pipe up through the hole into the earth. By the iron rod being lowered, the water can be shut-off and if there are any roots or cereals or grains or other crops or vegetation that are growing into the hole in which said iron rod goes, said threads will cut off and destroy them.

We claim:

In an irrigating system, an apertured pipe embedded in the ground, and means for preventing the clogging of said aperture and for controlling the flow therethrough comprising a rod accessible from the surface of the ground, and tapered and threaded at its inner end, said threaded, tapered end being received in said aperture and adapted in one position to permit a flow through said aperture, and when moved to a seating position in said aperture to clear the same of foreign matter and to cut off the flow.

Witness our hands on this, the 19th day of June, 1916.

PHILIP SCHWARZ.
WILLIAM J. BAKER.

Witnesses:
EDW. E. REARDON,
H. L. STUART.